US 6,617,829 B1

(12) United States Patent
Smith

(10) Patent No.: US 6,617,829 B1
(45) Date of Patent: Sep. 9, 2003

(54) AUTOMATIC CONDITIONING OF BATTERY IN BATTERY-POWERED APPARATUS

(75) Inventor: Michael G. Smith, Tustin, CA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 10/047,235

(22) Filed: Jan. 14, 2002

(51) Int. Cl.$^7$ ............................... H02J 7/00
(52) U.S. Cl. ..................................... 320/134
(58) Field of Search ......................... 320/134, 132, 320/136; 324/427, 435; 340/636.13, 636.15; 378/102; 702/63

(56) References Cited

U.S. PATENT DOCUMENTS

| | | | |
|---|---|---|---|
| 4,553,081 A | 11/1985 | Koenck | 320/131 |
| 4,709,202 A | 11/1987 | Koenck et al. | 320/112 |
| 4,885,523 A | 12/1989 | Koenck | 320/131 |
| 5,047,961 A | 9/1991 | Simonsen | 702/63 |
| 5,278,487 A | 1/1994 | Koenck | 320/132 |
| 5,530,362 A * | 6/1996 | Boehm et al. | 702/63 |
| 5,889,386 A * | 3/1999 | Koenck | 320/136 |
| 6,075,340 A | 6/2000 | Koenck | 320/112 |
| 6,091,227 A | 7/2000 | Beard | 320/132 |
| 6,181,103 B1 | 1/2001 | Chen | 320/106 |

OTHER PUBLICATIONS

Wysiwyg://18/http://access.nerac.com/N . . . temno=1&ordertp=undefined&app=undefined "Intelec: Twelfth International Telecommunications Energy Conference (Cat. No. 90CH2928–0) 1990".

* cited by examiner

Primary Examiner—Edward H. Tso
Assistant Examiner—Pia Tibbits
(74) Attorney, Agent, or Firm—Bradley Forrest; Mark S. Walker

(57) ABSTRACT

A method and a system of maintaining a rechargeable battery for an electronic device capable of utilizing the battery as a power source are disclosed. Usage of the battery is monitored. Based on this monitored usage, a user of the electronic device is notified of the need for performing a conditioning or deep discharge cycle on the battery. The user is provided with a user interface for scheduling the conditioning cycle on the battery. The conditioning cycle is then performed as scheduled, provided that the electronic device is coupled to an external power source and/or is in a mode appropriate for performing the conditioning cycle on the battery (e.g., shut down or standby mode). Further, the life capacity of the battery may be monitored, and the user may be notified of the need to replace the battery if the life capacity of the battery falls below a predetermined threshold.

26 Claims, 3 Drawing Sheets

AUTOMATIC CONDITIONING OF BATTERY IN BATTERY-POWERED APPARATUS

FIELD OF THE INVENTION

The present invention relates to maintenance of rechargeable batteries, and in particular to automatic conditioning of a rechargeable battery in a battery-powered apparatus.

BACKGROUND OF THE INVENTION

Many electronic devices such as laptop computers utilize rechargeable batteries in order to operate in a portable mode. It is desirable to have long-lasting batteries to optimize the length of time that the electronic device can be used prior to recharging the batteries. The battery, or the device using the battery, is able to determine the approximate remaining time that the battery can provide sufficient power to operate the electronic device. Some laptop computers use an icon to indicate the amount of charge left on a battery.

Users of electronic devices vary the patterns of their usage. Often, they will use the device for a short period of time in portable mode, and then connect to an AC power source to recharge the battery. The device is more likely used for a long period of time coupled to the AC power source without discharging the battery, leading to a self-discharge condition in which useful capacity of the battery is lost. To restore the capacity of the battery to hold a maximum or near maximum charge, a conditioning or deep discharge cycle can be performed on the battery in which the battery is completely discharged and then recharged.

However, users of electronic devices are often unaware of the need for performing the conditioning cycle on the battery and/or do not know how to execute the cycle. Also, the conditioning cycle can take a significant amount of time to complete. The conditioning cycle must be carefully scheduled to ensure that the conditioning cycle is not performed when the electronic device needs the battery for operation in portable mode. It may not be feasible to use the device in portable mode if the conditioning cycle is in the deep discharge process, and minimal or no charge is remaining in the battery. Further, use of the electronic device prior to completion of the recharging process may lead to further diminution of the capacity of the battery to hold a maximum charge.

Therefore, it would be advantageous to provide a method and a system of automatically determining the need for and then scheduling the conditioning cycle for the battery, while also notifying the user of the need for and the scheduled time of the conditioning cycle. It would also be desirable that such a method and system would perform the conditioning cycle on the battery at the scheduled time.

SUMMARY OF THE INVENTION

Accordingly, the present invention is directed to a method and a system of maintaining a rechargeable battery for an electronic device.

In one embodiment, usage of the battery is monitored. Based on the monitored usage of the battery, a need for performing a conditioning or deep discharge cycle on the battery is determined, and a user of the electronic device is notified of such need. The user is provided with a user interface for scheduling the conditioning cycle on the battery. The conditioning cycle is then performed as scheduled, provided that the electronic device is coupled to an external power source and/or is in a mode appropriate for performing the conditioning cycle on the battery. For example, if the electronic device is a portable computer, the computer may need to be shut down or operating in standby mode. In particular embodiments of the invention, the conditioning cycle may include a controlled deep discharge of the battery, time to allow the battery to cool, and then a full recharging of the battery. In further embodiments of the invention, the life capacity of the battery may be monitored, and the user may be notified of the need to replace the battery if the life capacity of the battery falls below a predetermined threshold.

DETAILED DESCRIPTION OF THE INVENTION

In the following description, reference is made to the accompanying drawings that form a part hereof and that show, by way of illustration, specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limiting sense, and the scope of the present invention is defined by the appended claims.

Figure 1:
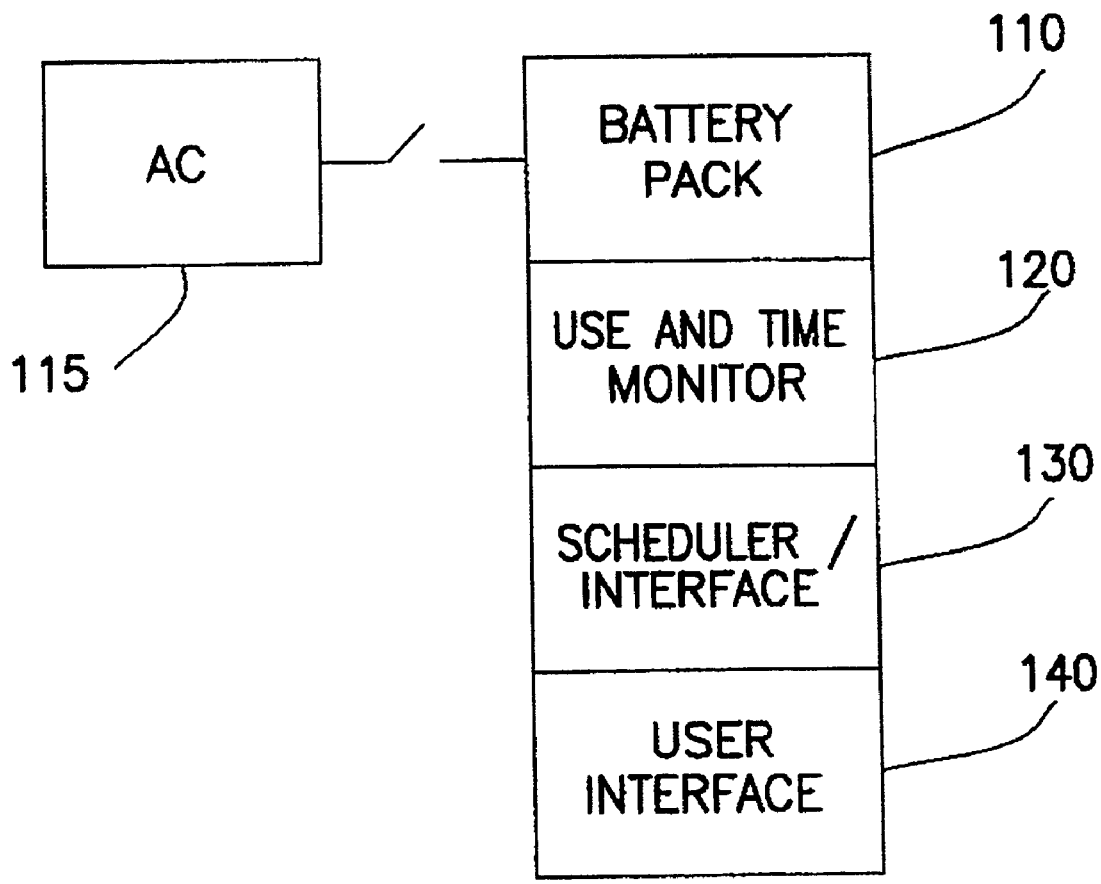
FIG. 1 is a block diagram of an electronic device having a rechargeable battery for operation in a portable mode in accordance with the present invention.

FIG. 1 illustrates an electronic device having a rechargeable battery for operation in a portable mode in accordance with the present invention. The electronic device includes a battery pack 110 that is switchably coupled to an AC power source 115. When the battery pack 110 is not coupled to the AC power source 115, the electronic device may be operated in a portable mode utilizing the battery pack 110. When the battery pack 110 is coupled to the AC power source 115, the electronic device may be operated utilizing the AC power source 115, and the battery pack 110 may be recharged by the AC power source 115.

The electronic device further includes a usage and time monitor 120 that tracks usage of the battery pack 110. The usage and time monitor 120 may record information about charging, static discharging, use discharging, and recharging of the battery pack 110, such as the total number of discharge and recharge cycles, the number of discharge and recharge cycles since the previous conditioning cycle, and the like. The usage and time monitor 120 may also record the time of day and/or the amount of time that the battery pack 110 is used, the amount of time since the previous conditioning cycle for the battery pack 110, and the like. The usage and time monitor 120 may further record information about each deep discharge or conditioning cycle in order to determine the overall state of the battery pack 110. For example, while the battery pack 110 is completely discharged, the rate of discharge may be measured and stored to estimate the life capacity of the battery pack 110.

The electronic device also includes a scheduler/interface 130 that determines when a conditioning cycle for the battery pack 110 is necessary and schedules the conditioning cycle accordingly. Based on the monitored usage of the battery pack 110, the scheduler/interface 130 calculates the self-discharge time of the battery pack 110. Once the battery pack 110 reaches a predetermined percentage of self-discharge, the scheduler/interface 130 determines that a conditioning or deep discharge cycle is necessary and notifies a user of the electronic device that the conditioning cycle will be performed on a specific date. In one embodiment, this notification is provided by a graphical user interface 140 on a display of the electronic device. In further embodiments, the user interface 140 may include a speaker on or coupled to the electronic device, and the notification may be provided audibly to the user.

If the user agrees with the scheduled date, the conditioning cycle is performed on the battery pack 110 as scheduled, provided that the battery pack 110 is coupled to the AC power source 115 and the electronic device is in a desired state of use, such as shut down or in standby mode. Other criteria for performing the conditioning cycle may include the time of day. In one embodiment, the user may indicate particular times of day when the electronic device will not be in use. In other embodiments, such information may be obtained from the statistics recorded by the usage and time monitor 120. For instance, the monitor 120 may record information indicating that the electronic device is never used between 1 AM and 6 AM, and thus, this time of day may be determined to be an optimal time for performing the conditioning cycle.

Figure 2:
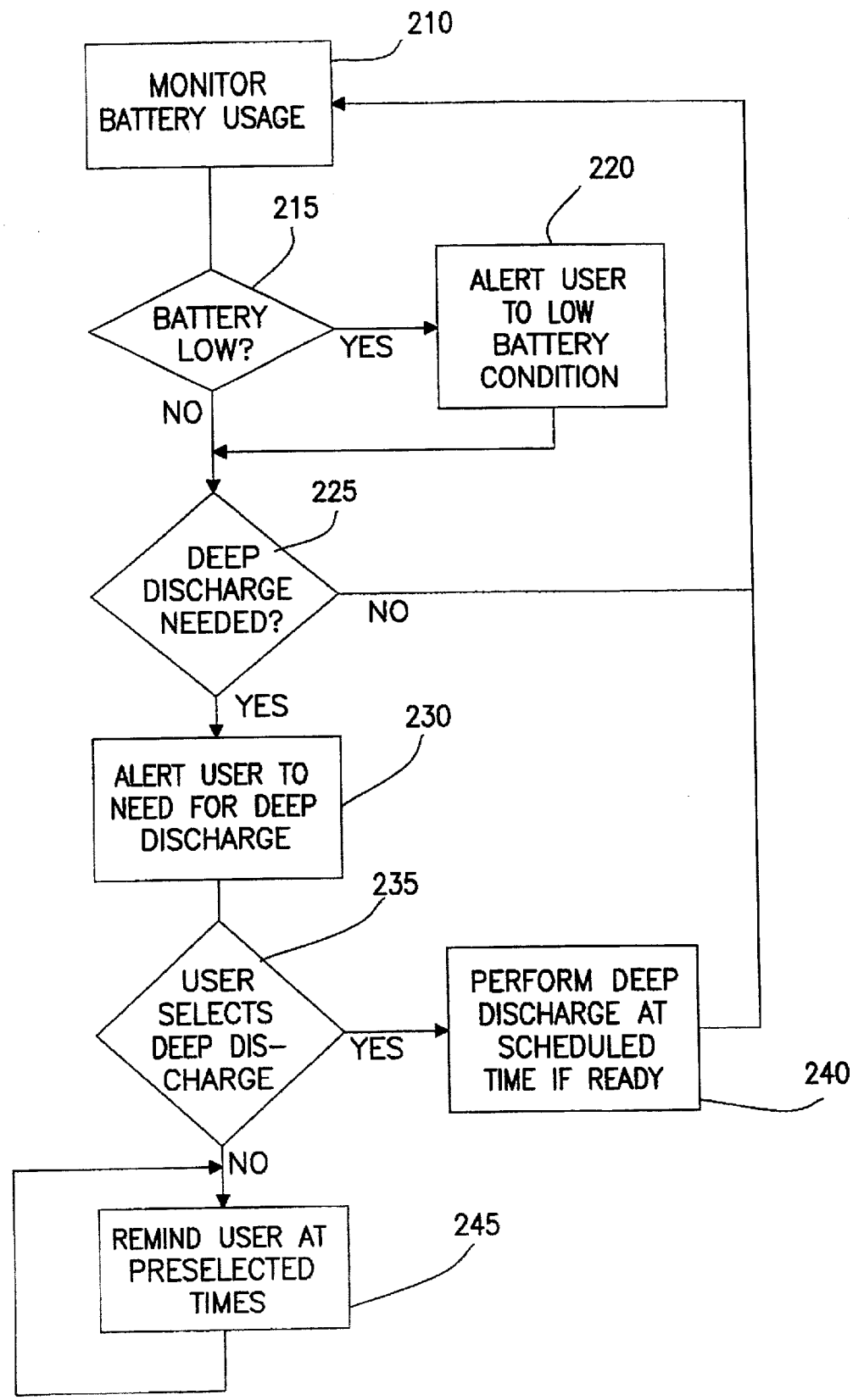
FIG. 2 is a flowchart showing a method of maintaining a rechargeable battery for an electronic device in accordance with the present invention.

FIG. 2 provides a flowchart showing a method of maintaining a rechargeable battery for an electronic device in accordance with the present invention. Usage of the battery is monitored at step 210. For example, information about charging, static discharging, use discharging, and recharging of the battery may be recorded, such as the total number of discharge and recharge cycles, the number of discharge and recharge cycles since the previous conditioning cycle, and the like. Information may also be recorded about the time of day and/or the amount of time that the battery is used, the amount of time since the previous conditioning cycle for the battery, and the like. Further, the amount of charge remaining on the battery for operation of the electronic device in portable mode is determined. If the remaining charge on the battery is low at step 215, the user is alerted to the low battery condition at step 220, such as by an audible or visual indication that the battery requires recharging.

Otherwise, the self-discharge time of the battery is calculated based on the monitored usage information. Once the battery reaches a predetermined percentage of self-discharge, it is determined that a deep discharge or conditioning cycle is needed in step 225, and the conditioning cycle is scheduled for a specific date and time. The user is then notified that the conditioning cycle is needed and will be performed at the scheduled date and time at step 230. At step 235, the user is provided with the option of accepting or modifying the scheduled date and time for the deep discharge or conditioning cycle. For instance, the user may select to immediately perform the deep discharge cycle on the battery, or alternatively, may change the date and/or time for the deep discharge cycle. After the user either accepts or modifies the scheduled date and/or time for the deep discharge cycle, the deep discharge cycle will then be executed at the selected date and time in step 240, provided that the battery is coupled to an AC power source and the electronic device is operating in a desired mode, such as shut down or in standby mode. If the battery is not coupled to an AC power source and/or the electronic device is not operating in a desired mode, the deep discharge cycle may be postponed to a later date and time. In other embodiments, the mode of operation of the device may not be considered in determining whether to perform the deep discharge cycle. If the user elects not to accept or modify the scheduled date and time for the deep discharge cycle, or alternatively if the deep discharge cycle is not performed at the scheduled date and time due to lack of an AC power source and/or a desired operating mode for the electronic device, the user will be periodically reminded of the need for the deep discharge cycle and again provided with the option of accepting or modifying a newly scheduled date and time for the deep discharge cycle at step 245.

At step 240, while the deep discharge or conditioning cycle is performed on the battery, the battery may also be monitored in order to determine the overall state of the battery. During the discharge cycle, the battery is fully discharged as specified by the manufacturer of the battery. The rate of discharge may also be measured and stored to estimate the life capacity of the battery. After discharging, the battery is then allowed to cool. During the recharge cycle, the battery is recharged, again as specified by the manufacturer. If the battery retains below a predetermined percentage of the specified maximum charge, such as 30% of the maximum charge, the user may be notified that the battery should be replaced.

Figure 3:
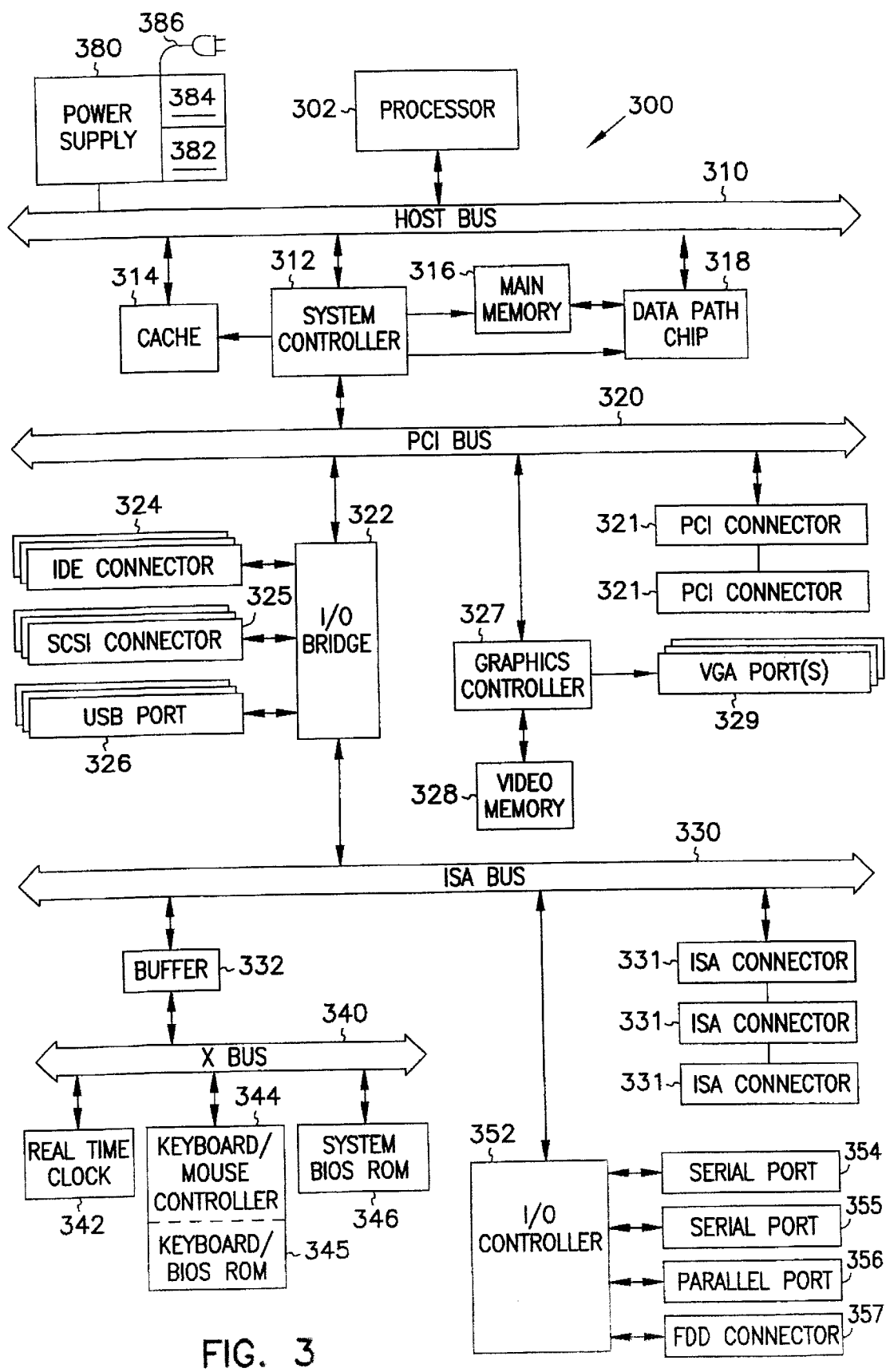
FIG. 3 is a block diagram of a portable computer in accordance with the present invention.

FIG. 3 is a block diagram of a computer system 300 with a rechargeable battery for operation in a portable mode in accordance with the present invention. The computer system 300 is capable of monitoring usage of the battery, determining whether a deep discharge or conditioning cycle is needed, scheduling the conditioning cycle for the battery, notifying a user of the need for the conditioning cycle and the scheduled date and time for the cycle, and performing the conditioning cycle as scheduled if the computer system 300 is in a state where the cycle may be performed. In this embodiment, a processor 302, a system controller 312, a cache 314, and a data-path chip 318 are each coupled to a host bus 310. Processor 302 is a microprocessor such as a 486-type chip, a Pentium®, Pentium® II, Pentium® III, Pentium® 4, or other suitable microprocessor. Cache 314 provides high-speed local-memory data for processor 302, and is controlled by system controller 312, which loads cache 314 with data that is expected to be used soon after the data is placed in cache 314 (i.e., in the near future). Main memory 316 is coupled between system controller 312 and data-path chip 318, and in one embodiment, provides random access memory of between 16 MB and 256 MB or more of data. In one embodiment, main memory 316 is provided on SIMMs (Single In-line Memory Modules), while in another embodiment, main memory 316 is provided on DIMMs (Dual In-line Memory Modules), each of which plugs into suitable sockets provided on a motherboard. Main memory 316 includes standard DRAM (Dynamic Random-Access Memory), EDO (Extended Data Out) DRAM, SDRAM (Synchronous DRAM), or other suitable memory technology. System controller 312 controls PCI (Peripheral Component Interconnect) bus 320, a local bus for system 300 that provides a high-speed data path between processor 302 and various peripheral devices, such as graphics devices, storage drives, network cabling, etc. Data-path chip 318 is also controlled by system controller 312 to assist in routing data between main memory 316, host bus 310, and PCI bus 320.

In one embodiment, PCI bus 320 provides a 32-bit-wide data path that runs at 33 MHz. In another embodiment, PCI bus 320 provides a 64-bit-wide data path that runs at 33

MHz. In yet other embodiments, PCI bus 320 provides 32-bit-wide or 64-bit-wide data paths that run at higher speeds. In one embodiment, PCI bus 320 provides connectivity to I/O bridge 322, graphics controller 327, and one or more PCI connectors 321 (i.e., sockets into which a card edge may be inserted), each of which accepts a standard PCI card. In one embodiment, I/O bridge 322 and graphics controller 327 are each integrated on the motherboard along with system controller 312, in order to avoid a board-connector-board signal-crossing interface and thus provide better speed and reliability. In the embodiment shown, graphics controller 327 is coupled to a video memory 328 that includes memory such as DRAM, EDO DRAM, SDRAM, or VRAM (Video Random-Access Memory), and drives VGA (Video Graphics Adaptor) port 329. VGA port 329 can connect to industry-standard monitors such as VGA-type, SVGA (Super VGA)-type, XGA-type (extended Graphics Adaptor) or SXGA-type (Super XGA) display devices. Other input/output (I/O) cards having a PCI interface can be plugged into PCI connectors 321. Network connections providing video input are also represented by PCI connectors 321.

In one embodiment, I/O bridge 322 is a chip that provides connection and control to one or more independent IDE (Integrated Drive Electronics) connectors 324 or SCSI (Small Computer System Interface) connectors 325, to a USB (Universal Serial Bus) port 326, and to ISA (Industry Standard Architecture) bus 330. In this embodiment, IDE connector 324 provides connectivity for up to two standard IDE-type devices such as hard disk drives, CD-ROM (Compact Disk-Read-Only Memory) drives, DVD (Digital Video Disk) drives, videocassette recorders, or TBU (Tape-Backup Unit) devices. In one similar embodiment, two IDE connectors 324 are provided, and each provide the EIDE (Enhanced IDE) architecture. In the embodiment shown, SCSI connector 325 provides connectivity for up to seven or fifteen SCSI-type devices (depending on the version of SCSI supported by the embodiment). In one embodiment, I/O bridge 322 provides ISA bus 330 having one or more ISA connectors 331 (in one embodiment, three connectors are provided). In one embodiment, ISA bus 330 is coupled to I/O controller 352, which in turn provides connections to two serial ports 354 and 355, parallel port 356, and FDD (Floppy-Disk Drive) connector 357. At least one serial port 354 or 355 is coupled to a modem for connection to a telephone system. In one embodiment, ISA bus 330 is connected to buffer 332, which is connected to X bus 340, which provides connections to real-time clock 342, keyboard/mouse controller 344 and keyboard BIOS ROM (Basic Input/Output System Read-Only Memory) 345, and to system BIOS ROM 346.

The integrated computer system 300 performs several functions identified in the flowchart of FIG. 2. Such functions are implemented in software in one embodiment, where the software comprises computer executable instructions stored on computer readable media such as disk drives coupled to connectors 324 or 325, and executed from main memory 316 and cache 314.

A power supply 380 provides power to each of the above components. Individual connections to such components are not shown as they are well known to those skilled in the art. In one embodiment, power supply 380 is coupled to the host bus 310 and/or other buses which distribute power to each of the components. In an alternative embodiment, power supply 380 may be coupled to the system controller 312, I/O bridge 322, or I/O controller 352, which may then perform one or more of the functions identified in the flowchart of FIG. 2, such as monitoring usage of the battery and the like. Power supply 380 is coupled to a rechargeable battery 382 and a recharging circuit 384, and also has a connector 386 for coupling to an AC power source. Functionality for monitoring usage of the battery 382, determining whether a deep discharge or conditioning cycle is needed, scheduling the conditioning cycle for the battery 382, notifying a user of the need for the conditioning cycle and the scheduled date and time for the cycle, and performing the conditioning cycle as scheduled if the computer system 300 is in a state where the cycle may be performed is provided by any one of the power supply 380, battery 382, recharging circuit 384, or other components in system 300, such as the processor 302 executing software from cache 314 or main memory 316, or alternatively, the system controller 312, I/O bridge 322, or I/O controller 352 if such component is coupled to the power supply 380. While the method and the system of maintaining a rechargeable battery for an electronic device have been described with respect to a portable computer such as system 300, the present invention may also be incorporated into many other electronic devices, analog devices, and stand-alone battery packs.

What is claimed is:

1. A method of maintaining a rechargeable battery for an electronic device capable of utilizing the battery as a power source, the method comprising the steps of:

monitoring usage of the battery;

automatically determining a need to perform a conditioning cycle on the battery based upon the monitored usage of the battery;

determining a schedule for the conditioning cycle;

notifying a user of the need to perform the conditioning cycle on the battery and the schedule for the conditioning cycle; and providing the user with a user interface capable of modifying the schedule for the conditioning cycle.

2. The method of claim 1, wherein the schedule for the conditioning cycle includes at least one of: a scheduled date and a scheduled time.

3. The method of claim 2, further comprising the steps of:

upon arrival of at least one of the scheduled date and the scheduled time, checking whether a connection between the battery and an external power source exists; and if the connection between the battery and the external power source exists, performing the conditioning cycle on the battery in accordance with at least one of the scheduled date and the scheduled time.

4. The method of claim 3, wherein the performing step further comprises:

discharging the battery;

allowing the battery to cool; and recharging the battery.

5. The method of claim 4, further comprising the steps of:

during the discharging step, determining a life capacity of the battery; and if the life capacity of the battery is below a predetermined threshold, notifying the user to replace the battery.

6. The method of claim 3, further comprising:

upon arrival of at least one of the scheduled date and the scheduled time, checking whether the electronic device is in a mode capable of performing the conditioning cycle on the battery, wherein the conditioning cycle is performed on the battery if the electronic device is in said mode.

7. A computer readable medium having instructions stored thereon for execution on a computer to perform a method of maintaining a rechargeable battery for the computer, the method comprising the steps of:

monitoring usage of the battery;

automatically determining a need to perform a conditioning cycle on the battery based upon the monitored usage of the battery;

determining a schedule for the conditioning cycle;

notifying a user of the need to perform the conditioning cycle on the battery and the schedule for the conditioning cycle; and providing the user with a user interface capable of modifying the schedule for the conditioning cycle.

8. The computer readable medium of claim 7, wherein the schedule for the conditioning cycle includes at least one of: a scheduled date and a scheduled time.

9. The computer readable medium of claim 8, wherein the method further comprises the steps of:

upon arrival of at least one of the scheduled date and the scheduled time, checking whether a connection between the battery and an external power source exists; and if the connection between the battery and the external power source exists, performing the conditioning cycle on the battery in accordance with at least one of the scheduled date and the scheduled time.

10. The computer readable medium of claim 9, wherein the performing step further comprises:

discharging the battery;

allowing the battery to cool; and recharging the battery.

11. The computer readable medium of claim 10, wherein the method further comprises the steps of:

during the discharging step, determining a life capacity of the battery; and if the life capacity of the battery is below a predetermined threshold, notifying the user to replace the battery.

12. The method of claim 9, wherein the method further comprises the step of:

upon arrival of at least one of the scheduled date and the scheduled time, checking whether the computer is in a mode capable of performing the conditioning cycle on the battery, wherein the conditioning cycle is performed on the battery if the computer is in said mode.

13. A portable electronic device comprising:

a rechargeable battery capable of providing power for the electronic device;

a monitor coupled to the rechargeable battery for monitoring usage of the battery;

a scheduler coupled to the monitor for automatically determining a need to perform a conditioning cycle on the battery based upon the monitored usage of the battery and determining a schedule for the conditioning cycle; and a user interface coupled to the scheduler for notifying a user of the need to perform the conditioning cycle on the battery and the schedule for the conditioning cycle and capable of modifying the schedule for the conditioning cycle based on input from a user.

14. The electronic device of claim 13, wherein the battery is capable of coupling to a recharger for performing the conditioning cycle on the battery and an external power source for providing power to the electronic device during the conditioning cycle, and wherein if the battery is coupled to the recharger and the external power source, the conditioning cycle is performed on the battery in accordance with the schedule for the conditioning cycle.

15. The electronic device of claim 14, wherein the monitor is further capable of determining a life capacity of the battery during the conditioning cycle, and wherein the user interface is further capable of notifying the user to replace the battery if the life capacity of the battery is below a predetermined threshold.

16. The electronic device of claim 14, further wherein the conditioning cycle is performed on the battery if the electronic device is in a mode capable of performing the. conditioning cycle on the battery.

17. A method of maintaining a rechargeable battery for an electronic device capable of utilizing the battery as a power source, the method comprising the steps of:

monitoring usage of the battery;

automatically notifying a user of a need to perform a conditioning cycle on the battery based upon the monitored usage of the battery;

scheduling the conditioning cycle for a specified period;

upon arrival of the scheduled period for the conditioning cycle, checking whether a connection between the battery and an external power source exists; and if the connection between the battery and the external power source exists, automatically performing the conditioning cycle on the battery during the scheduled period.

18. The method of claim 17, wherein the scheduling step further comprises:

notifying the user of a suggested period for the conditioning cycle; and providing the user with a user interface capable of modifying the scheduled period the conditioning cycle.

19. The method of claim 17, wherein the performing step further comprises:

discharging the battery;

allowing the battery to cool; and recharging the battery.

20. The method of claim 19, further comprising the steps of:

during the discharging step, determining a life capacity of the battery; and if the life capacity of the battery is below a predetermined threshold, notifying the user to replace the battery.

21. The method of claim 17, further comprising:

upon arrival of the scheduled period for the conditioning cycle, checking whether the electronic device is in a mode capable of performing the conditioning cycle on the battery, wherein the conditioning cycle is performed on the battery if the electronic device is in said mode.

22. A computer readable medium having instructions stored thereon for causing a computer to execute a method of maintaining a rechargeable battery for the computer, the method comprising the steps of:

monitoring usage of the battery;

automatically notifying a user of a need to perform a conditioning cycle on the battery based upon the monitored usage of the battery;

scheduling the conditioning cycle for a specified period;

upon arrival of the scheduled period for the conditioning cycle, checking whether a connection between the battery and an external power source exists; and if the connection between the battery and the external power source exists, automatically performing the conditioning cycle on the battery during the scheduled period.

23. The computer readable medium of claim 22, wherein the scheduling step further comprises:

notifying the user of a suggested period for the conditioning cycle; and providing the user with a user interface capable of modifying the scheduled period or the conditioning cycle.

24. The computer readable medium of claim 22, wherein the performing step further comprises:

discharging the battery;

allowing the battery to cool; and recharging the battery.

25. The computer readable medium of claim 24, wherein the method further comprises the steps of:

during the discharging step, determining a life capacity of the battery; and if the life capacity of the battery is below a predetermined threshold, notifying the user to replace the battery.

26. The computer readable medium of claim 22, the method further comprising the steps of:

upon arrival of the scheduled period for the conditioning cycle, checking whether the computer is in a mode capable of performing the conditioning cycle on the battery, wherein the conditioning cycle is performed on the battery if the computer is in said mode.

* * * * *